Aug. 30, 1966        E. G. FREESE        3,269,737
UNBALANCED PRESSURE SHAFT SEAL
Filed Nov. 12, 1963        3 Sheets-Sheet 1
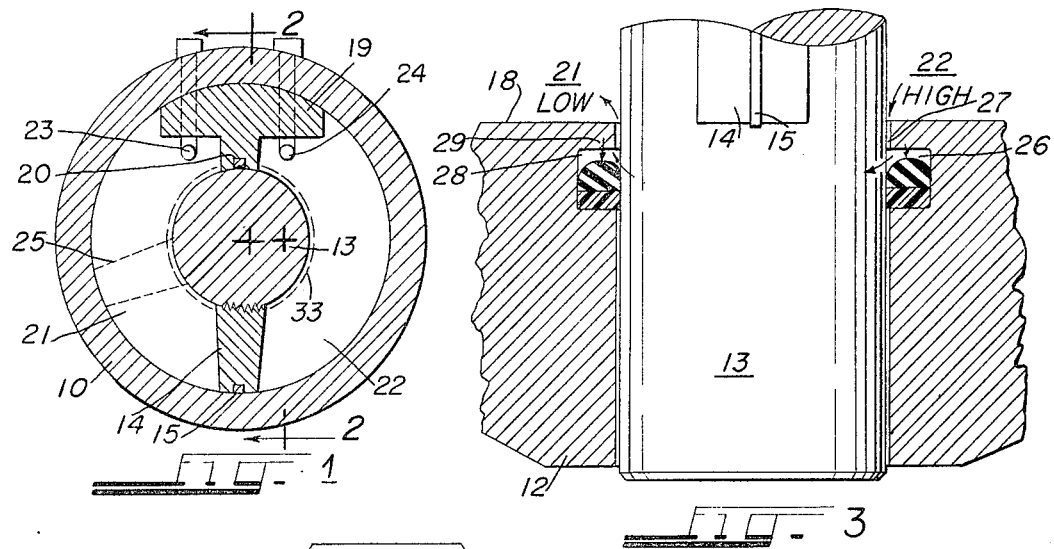
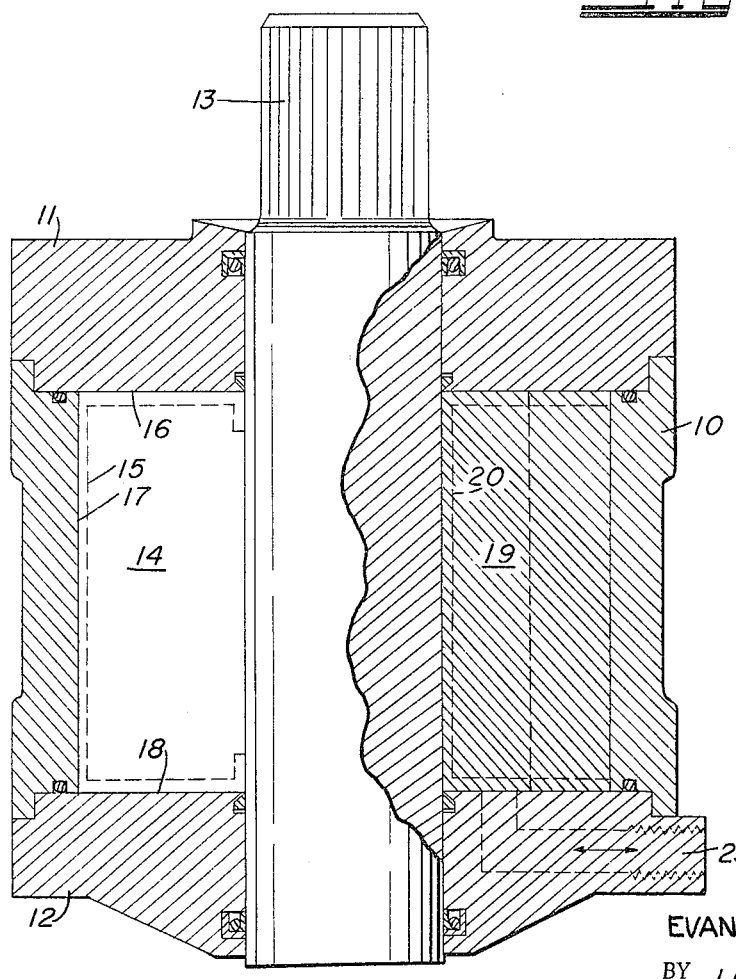
INVENTOR.
EVANS GLENN FREESE
BY Hubert Miller Aug. 30, 1966  E. G. FREESE  3,269,737
UNBALANCED PRESSURE SHAFT SEAL
Filed Nov. 12, 1963  3 Sheets-Sheet 2
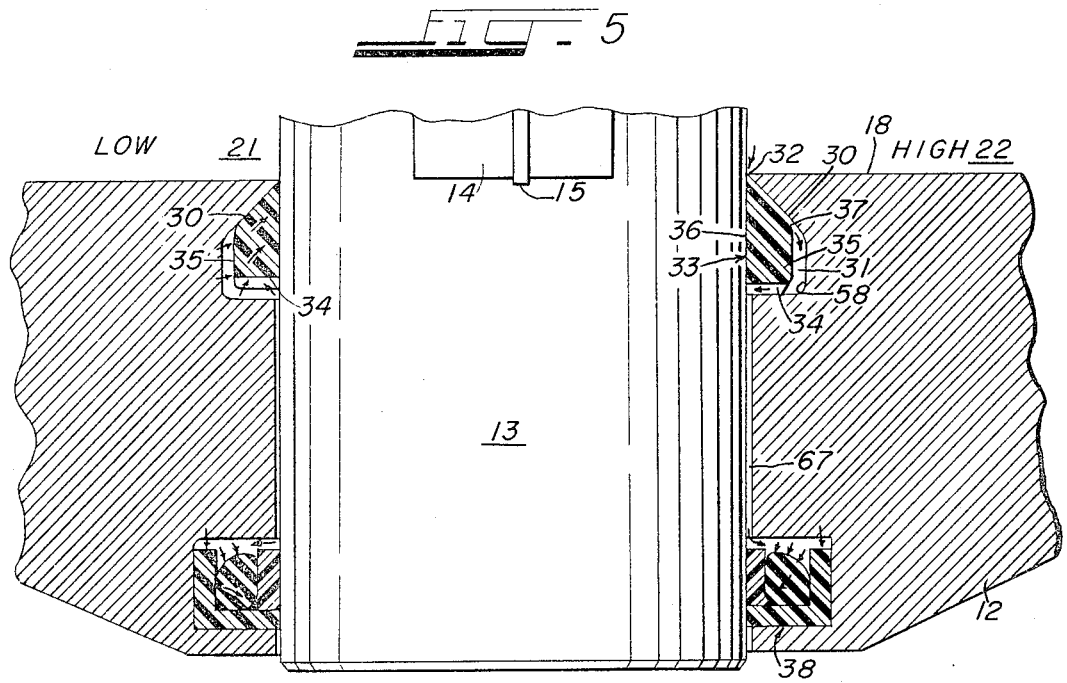
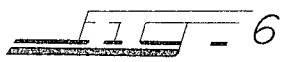
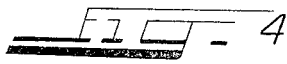
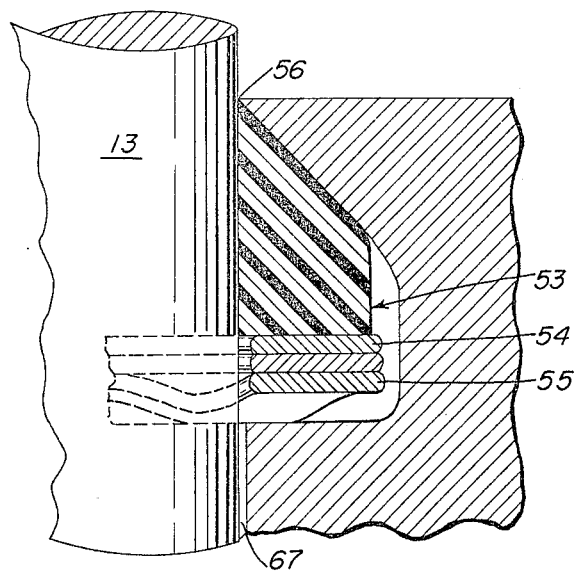
EVANS GLENN FREESE
INVENTOR.
BY *Hubert Miller*
ATTY.

Aug. 30, 1966   E. G. FREESE   3,269,737
UNBALANCED PRESSURE SHAFT SEAL
Filed Nov. 12, 1963   3 Sheets-Sheet 3
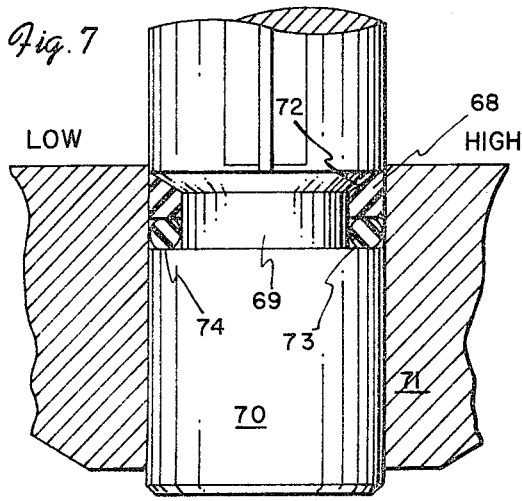
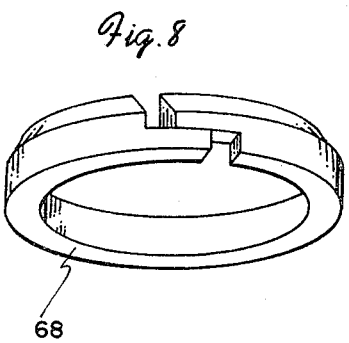
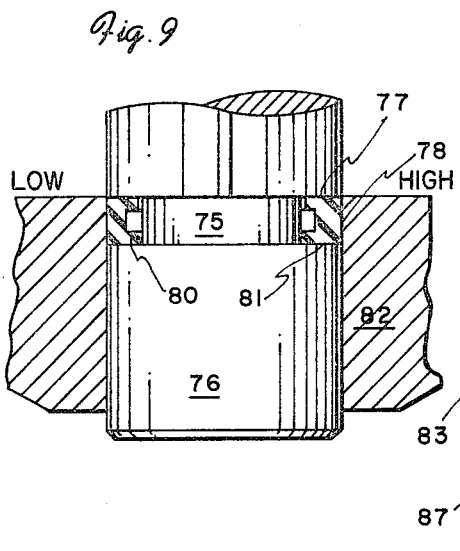
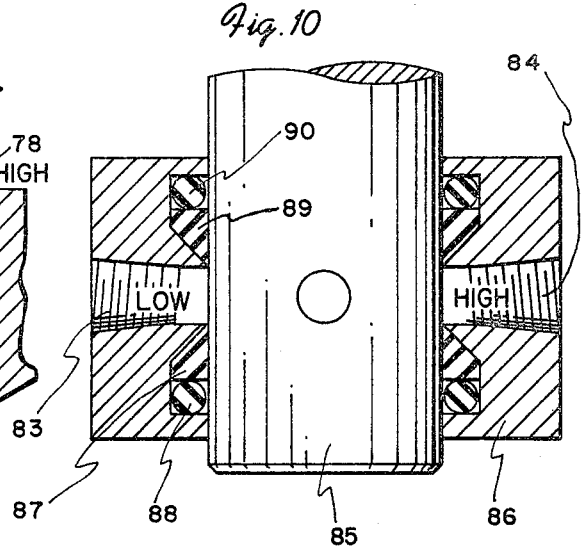
EVANS GLENN FREESE
INVENTOR.
BY *Hubert D Miller*
ATTORNEY United States Patent Office 3,269,737
Patented August 30, 1966

3,269,737
UNBALANCED PRESSURE SHAFT SEAL
Evans Glenn Freese, Hutchinson, Kans., assignor to The Cessna Aircraft Company, Wichita, Kans., a corporation of Kansas
Filed Nov. 12, 1963, Ser. No. 322,794
9 Claims. (Cl. 277—59)

This invention relates generally to annular shaft seals, and more particularly to a ring-type seal of wedge shaped cross section, seated in a generally complementally shaped groove, and capable of acting as a pressure closed valve when a portion of the seal is subjected to high fluid pressure, and another circumferentially spaced portion is subjected to lower fluid pressure.

The seal structure constituting the instant invention is particularly adapted for use in vane type hydraulic motors in which a cylindrical rotor housing is internally divided into two separate fluid pressure cavities by an axially disposed rotor shaft, a radial wall wiping vane carried by the shaft, and by a fixed radial vane which wipes the surface of the rotor shaft as it oscillates. Motors of this type are often used to swing the boom of a mechanical shovel from side to side about an upright axis. When operator controlled high pressure fluid is introduced into the first internal cavity, the pressure is applied against the radial vane, which forces the entire rotor to rotate in one direction. Simultaneously the moving vane ejects fluid from the second cavity in the housing, which is at the time under much lower fluid pressure. When it is desired to swing the rotor shaft connected boom in the opposite direction, high pressure fluid is introduced into the second cavity of the rotor housing, and the first cavity becomes the low pressure or fluid return cavity.

In such motors, when ordinary endless ring seals seated in annular grooves in the end walls of the housing which journal the ends of the rotor shaft are used, fluid from whichever is the high pressure cavity at the moment enters the adjacent portion of the bearing clearance area, passes along and around the rotor shaft, enters the sealing ring groove, compresses the seal against the remote wall of its groove, thereby increasing the fluid flow area of the groove, and thence travels along the groove and around the shaft, above or below the adjacent end edge of the rotor vane, and dumps directly into the low pressure cavity of the rotor housing. Such leakage is clearly illustrated in FIG. 3 of the accompanying drawings.

In other words, a conventional ring seal in effect creates a direct leakage path from the high to the low pressure cavity, and such leakage is very undesirable because it allows the rotor and the working mechanism to which it is connected to "drift," at times when it is important for the operator to prevent movement of the rotor connected mechanism.

In addition to the above described use, the invention is well adapted for use in a Corliss type valve in which it is desirable to prevent leakage of fluid from a high pressure port around the valve clearance space to a lower pressure port, or in any other mechanism which includes one member having a cylindrical bore which closely embraces a second cylindrical member, and in which there is relative movement between the two members under conditions which expose different circumferential portions of the minute clearance space between them to spaced zones or areas which are under different fluid pressures.

It is a primary object of my invention to provide a ring seal and groove arrangement which will prevent leakage of rotor actuating fluid from the high pressure rotor housing cavity in a vane type hydraulic motor to the low pressure rotary housing cavity.

It is an additional object to provide a ring seal and groove arrangement which reduces the axial length of the bearing clearance space between the edge of the seal groove and the adjacent wall surface wiped by the edge of the rotor vane to zero, thus eliminating this part of the bearing clearance area as a leakage path from the high to the low pressure cavities in the rotor housing.

Another object is to provide a ring seal and groove combination in which that wall of the seal seating groove nearest the vane wiped wall surface of the rotor cavity meets that wall surface at an acute included angle, thus greatly reducing the bending stress on the lip of housing material which defines the mentioned end wall of the groove, when fluid pressure is applied to the outer surface of the ring seal to force it inward into sealing engagement with said lip of material and with the adjacent shaft surface. Such construction substantially eliminates instability in and breakage of the lip of housing material which defines the inner wall of the seal groove.

The invention, together with other objects attending its conception, will be more clearly understood when the following description is read in connection with the accompanying drawings in which:

FIG. 1 is a horizontal sectional view through a vane type hydraulic motor illustrating a shaft seal embodying my invention installed therein;

FIG. 2 is a vertical sectional view, on an enlarged scale, of the motor illustrated in FIG. 1, the view being taken generally along the line 2—2 of FIG. 1;

FIG. 3 is a fragmentary vertical sectional view through the lower end of a vane motor of the type illustrated in FIGS. 1 and 2, but shows a conventional shaft seal and groove structure installed therein;

FIG. 4 is a fragmentary perspective view of a wedge section endless ring seal embodying my invention;

FIG. 5 is an enlarged fragmentary vertical sectional view similar to FIG. 3, and illustrates a ring seal and groove construction embodying my invention installed in an end wall of the rotor housing surrounding the shaft immediately adjacent the high and low pressure cavities in the rotor housing; and FIG. 6 is a fragmentary view similar to FIG. 5, but illustrates a ring seal and groove construction which constitutes a second embodiment of my invention;

FIG. 7 is a view similar to FIG. 5, but shows the seal seating groove of the sealing structure recessed into the shaft instead of into the shaft journaling member; it also includes an outer end seal for the shaft as a part of the composite sealing structure;

FIG. 8 illustrates an annular seal of the split type having lapped ends;

FIG. 9 shows a different embodiment of the invention with the annular seal seated in a groove in a shaft rather than in the shaft journaling member; and FIG. 10 illustrates an annular seal structure embodying my invention, installed around the ported shaft of a Corliss type valve.

Referring to FIGS. 1 and 2, it will be seen that the vane motor illustrated includes a central housing section 10, closed by upper and lower end plates 11 and 12, which journal a rotor shaft 13 near its opposite ends. Shaft 13 has affixed thereto a radially extending rigid vane 14. The upper and lower horizontal edges and the outer vertical edge of vane 14 carry a resilient fluid pressure seal, indicated by the numeral 15, which seals against and wipes the internal wall surfaces 16, 17 and 18 as the vane oscillates.

Similarly a fixed radially disposed vane 19, secured to the central housing section is equipped with a resilient seal 20 which seals against and wipes the surface of shaft 13 as the shaft oscillates, and prevents fluid from leaking from high pressure to low pressure areas.

The rotor housing of the motor is thus divided by shaft 13 and by vanes 14 and 19 into two fluid pressure cavities or chambers, 21 and 22. These cavities are provided respectively with combination fluid pressure inlets and outlets, 23 and 24, which are connected through conduits and a control valve (not shown) with a conventional hydraulic pressure system. When the operator introduces high pressure fluid from the system into cavity 22, pressure is applied to vane 14 which forces the entire rotor including shaft 13 to rotate clockwise, as indicated by the broken lines 25. Cavity 21 is then at low pressure, and fluid is forced out of that cavity through outlet 23 to the system reservoir. By introducing high pressure fluid into cavity 21, the rotor is caused to oscillate counterclockwise, and cavity 22 is at low pressure.

In a motor of the type described, the sealing strips 15 and 20 are sufficiently efficient to prevent any appreciable leakage of fluid from the high pressure cavity around the vane edges into the low pressure cavity. The chief problem has been that the high pressure fluid enters the minute space between the surface of shaft 13 and the adjacent surface of the shaft bearings, travels outward along the shaft until it reaches the seal groove 26 (FIG. 3), then travels around the shaft along the seal groove 26, and along the bearing clearance space 27 until it passes beneath the adjacent edge of the vane 14, and then discharges directly into the low pressure cavity 21.

This leakage path is clearly indicated by the arrows in FIG. 3. It can readily be seen from FIG. 3 that if the annular seal groove 26 is moved outward in the end plate 12 toward the outer end of shaft 13, the axial length of the bearing clearance space 27, between the end plate internal surface 18 and the adjacent wall 28 of the groove 26 would be increased, thus increasing the total flow area through the bearing clearance space 27, and consequently the leakage from the high to the low pressure cavity.

In view of the above fact it has been common practice to place the wall 28 of the seal groove 26 as near to the wall surface 18 as possible. In so positioning the seal groove, the lip of housing material 29 which defines the inner wall 28 of groove 26 becomes very thin. As the thickness of this lip 29 is reduced it becomes unstable, and failure occurs if the seal groove is moved too close to the inner wall surface 18.

The seal and groove construction which constitutes my invention solves the above described problems by making it possible to reduce the thickness of the radial edge of lip 29 of FIG. 3 to zero axial thickness, thus eliminating the natural bearing clearance leakage path 27 which normally exists between the seal groove wall 28 and the internal wall surface 18, along the shaft. My construction also eliminates lip failure by arranging the inner wall 30 (FIG. 5) of the seal retaining groove 31 to meet the wall surface 18 at an acute included angle. There is a minimum clearance between the tip 32 of this angle and the adjacent surface of shaft 13. The angle is not critical, and may be varied.

As shown in FIG. 5 the groove 31 in the end plate 12 which surrounds the shaft is made deeper radially than the generally wedge shaped resilient and compressible seal 33, which the groove houses, and is also made axially longer than seal 33, the reasons for which will become clear as the description proceeds.

A preferred configuration for ring seal 33 is clearly shown in FIG. 4. It includes a serrated outer end surface 34, an outer circumferential surface 35, an inner circumferential surface 36, which is of a radius to snugly fit the surface of shaft 13, and an inwardly sloping wedge forming surface 37, the angle of slope being preferably but not necessarily substantially the same as the slope angle of the surface 30 of the seal groove 31. The material from which seal 33 is made is a resilient, flexible but extrusion and wear resistant material, such as molded Teflon. Teflon is relatively soft, which allows it to conform readily under pressure to any irregularities in the seal groove.

The above described ring seal and generally complemental groove assembly is ordinarily used in conjunction with an outer shaft seal, which may be of conventional O-ring type with back-up washer, as shown in FIG. 3. In FIG. 5 a variation of such an outer seal is designated as a whole by the numeral 38. A detailed explanation of seal 38 and its operation is believed unnecessary, because such seals are well known.

Operation

Again referring to FIG. 1, it should be borne in mind that in the rotary vane motor shown, either compartment 21 or compartment 22 may become the higher pressure compartment, at which time the other compartment becomes the lower pressure compartment. One circumferential portion of the ring seal 33 is thus subjected to hydraulic fluid under high pressure, while another portion is subjected to relatively lower pressure. The tendency, naturally, will be for the higher pressure fluid to flow into the ring groove 31 (FIG. 5), along the groove around the shaft, and into the lower pressure compartment.

Referring to FIG. 5, and assuming that compartment 22 is the higher pressure compartment, pressure fluid forces its way past angle tip 32 of groove 31, travels between the sloping surfaces 37 and 30 of the seal and groove respectively, travels radially inward along the grooves in the serrated seal surface 34, and into the minute bearing clearance space or cavity 67, which the fluid fills outward to seal 38, and applies sealing pressure to that seal, as indicated by the small arrows. The shaft bearing is thus pressure lubricated substantially throughout its axial length.

High pressure fluid in the seal groove 31 and in bearing clearance space 67 travels into that portion of groove 31 which is coextensive with the lower pressure compartment 21, applies pressure to the surfaces 34 and 35 of the ring seal 33, and forces the wedge shaped portion of the seal into tight wedging engagement with the surface 30 of the seal groove, and with the adjacent surface of shaft 13. The forcing, wedging action of the fluid is indicated by the small arrows in the upper left hand side of FIG. 5.

From the above it will be understood that that portion of ring seal 33 which is adjacent and co-extensive with the inner radius of the low pressure compartment 21 acts as a pressure closed valve, and prevents the free travel of high pressure fluid around the shaft into the low pressure compartment. As the shaft turns and partitions vane 14 changes its location, varying portions of the seal 33 assume this valving function.

If pressure in the two motor compartment is reversed, the valving or sealing action is assumed by the opposite portion of the seal 33, as described above.

The ring seal 33 includes the serrated surface 34 to facilitate the passage of fluid freely into the bearing clearance area 67. The seal will function without the serrations.

FIG. 6 embodiment

In the FIG. 6 embodiment, the ring seal 53 is substantially the same in cross sectional shape and configuration except that the serrated outer end surface 34 has been omitted, making the seal a little shorter in axial length. The seal configuration groove is the same as in the FIG. 5 embodiment.

The primary difference is the addition of a washer 54, and a wave type circular spring 55. Both are of spiral construction with the convolutions lying flat against each other with the ends overlapping, so that both can be "spiraled" into the smaller diameter opening 56 at the tip angle of the seal groove.

Wave spring 55 serves to urge the seal 53 toward a normally seated position, as shown in FIG. 6, and the washer 54 serves to spread the spring load uniformly around the entire outer surface of the seal.

The spring load is great enough to overcome normal friction between the ring seal and shaft 13, and to normally maintain the seal in seated position in the absence of hydraulic pressure behind the seal. However, the load is light enough to permit fluid to flow from the higher pressure motor compartment past the seal into the seal groove and bearing clearance space 67.

The operation of the FIG. 6 embodiment is the same as the operation of the FIG. 5 embodiment.

It should be pointed out that both embodiments of the described seal and groove assembly will function properly without the outer shaft seal 38.

The high pressure fluid simply enters the seal groove 31, as previously described, and travels along and around the groove in the space between seal surface 35 and groove surface 58 (FIG. 5). When the high pressure fluid reaches the vicinity of the lower pressure motor compartment it forces the adjacent portion of the seal into wedging engagement with the groove surface 30 and with the shaft 13. There would be some leakage from the bearing clearance space 67, but the bearings would be lubricated, and there would be no "drifting" movement of the rotor because there is no direct leakage of fluid into the lower pressure motor compartment.

FIG. 7 structure

An alternative structure for accomplishing the above described results, and also for preventing leakage of pressure from the remote or outer end of the clearance space between the two members, is illustrated in FIG. 7.

In the FIG. 7 structure the resilient annular seal 68 is seated in a groove 69 which is recessed radially into a shaft 70, which is journaled in a bore in the member 71. The sloping conical end wall 72 of the groove, together with the adjacent surface of the journaling bore, form a wedge shaped valve seat, which receives and seats the complementally shaped end of seal 68. An additional annular sealing element 73, of resilient material, preferably of circular cross section, is of a size to be partially compressed when it is seated in the groove between the adjacent end of seal 68 and that end wall 74 of groove 69 which is remote from the wedge shaped valve seat. Due to this partial compression and to its inherent resilience, the seal 73 thus urges the wedge shaped end of seal 68 into initial sealing contact with the walls of the wedge shaped valve seat.

FIG. 7 operation

Fluid from the higher pressure zone forces its way past the wedge shaped end of seal 68 and into the groove 69. It then travels around the groove 69 and in attempting to emerge into the lower pressure zone at the left hand side of FIG. 7, the pressure difference forces seal 68 to seat on its seat and seal against the wedge shaped valve seat. Pressure in the groove then acts against seal 73 and compresses that seal, as shown in FIG. 7, so that it firmly seals the minute clearance space in the remote corner of the groove between the journal and the journaling member. Thus leakage from that end of the clearance space remote from the wedge shaped valve seat is prevented, without any need for a separate groove and seal 38, as shown in FIG. 5.

FIG. 9 embodiment

In FIG. 9 the seal receiving groove 75 is also recessed into the journal 76. In this embodiment the cooperating surfaces which form the valve seat for the seal do not lie at an acute included angle with respect to each other. Instead the end wall 77 of groove 75 lies in a plane which is perpendicular to the cooperating cylindrical surface 78 of the journaling member 79. The resilient seal 80 is generally U-shaped in cross section, as shown, and its inner end is complementally shaped to seat on the valve seat formed by the surfaces 77 and 78. Its opposite or outer end is also complementally shaped to seal on the seat formed by the surfaces 78 and 81.

FIG. 9 operation

In operation, fluid from the higher pressure zone forces its way along the inner end surface 77 of the valve seat into groove 75. It travels around the groove in seal 80, and when the fluid attempts to escape into the lower pressure zone, the difference in pressure forces the seal 80 to firmly seat on its seat, preventing loss of fluid into the low pressure zone. Simultaneously, the fluid under high pressure in groove 75 attempts to escape outward (downward in FIG. 9) through the clearance space between the adjacent cylindrical surfaces of the journal 76 and the journaling member 82. Due to the lower pressure in this space, the outer or lower end of seal 80 is forced by fluid pressure to seal the opening between the surfaces 78 and 81, thus preventing escape of fluid through that avenue. The seal thus performs a double sealing function.

FIG. 10 structure

The sealing structure of FIG. 10 is the same as the sealing structure illustrated in FIG. 7, except that it is installed in a Corliss type valve, and the seal receiving groove is recessed into the journaling member rather than into the journal. There is a double seal installation, one on each side of the opposed low and high pressure valve ports 83 and 84, to prevent fluid from flowing from the high pressure to the low pressure port, as previously described, and also to prevent fluid under high pressure from escaping in either direction along the minute clearance space between the cylindrical journal 85 and the cylindrical journaling surface of the outer member 86. The fluid pressure action on the sealing elements 87 and 88, and 89 and 90 is exactly the same as described in connection with the FIG. 7 structure.

From the above it will be seen that the described seal structure reduces the axial length of the leakage path between the seal and the adjacent vane wiped internal end wall surface of a vane motor to zero; that it provides pressure lubrication for the shaft bearings; and that by preventing leakage from the high to the low pressure compartment of a vane motor, it prevents "drift" or uncontrollable slow rotation of the rotor shaft of the motor, thus affording accurate control by the operator of the mechanism which is connected to the rotor shaft.

Having described the invention with sufficient clarity to enable those familiar with this art to construct and use it, I claim:

1. In a structure in which a rotatable shaft is journaled in a housing wall under operating conditions which subject different circumferential portions of the shaft journal to differential pressures from within the housing, an annular seal assembly for sealing between the shaft journaling surface of the housing wall and the adjacent surface of the shaft to prevent fluid from traveling from a higher pressure region in the housing through the bearing clearance space and into a lower pressure region in the housing, said seal assembly comprising:

an annular groove recessed into the shaft journaling portion of the housing wall near the inner surface thereof, said groove having a conical inner end wall surrounding the shaft, the apex of which, if the wall was extended, would lie on the longitudinal axis of the shaft at a location inside the housing, the inner edge of said conical end wall of the groove defining a circular opening closely encircling said shaft in a plane common to the plane of the inner surface of the shaft journaling housing wall; and an annular seal of flexible, resilient material seated in said groove, the cross sectional shape of said seal being loosely complemental to the cross sectional shape of said groove,
and including a generally wedge shaped inner end defined by
   (a) an axially extending cylindrical surface which is in continuous encircling contact with said shaft, and
   (b) an adjoining conical surface which is inclined toward the shaft axis at substantially the same angle as the conical end wall of said groove, and lies adjacent to and cooperates therewith,
whereby fluid from a higher pressure region within the housing forces it way into that circumferential portion of the seal groove which is coextensive with the high pressure region, into the space between the seal and the walls of the seal groove, travels around the groove and shaft in that space, and exerts an axial inward pressure against that circumferential portion of the seal which is coextensive with and adjacent to a lower pressure region in the housing, and urges the wedge shaped inner end of the last mentioned portion of the seal into wedging engagement with the cooperating conical wall of the seal groove and with the adjoining surface of the shaft, thereby blocking communication between higher and lower pressure regions in the housing through the minute bearing clearance space surrounding the shaft.

2. The seal assembly described in claim 1, and compressible means in the groove bearing against that wall of the groove which is most remote from the inner surface of the shaft journaling wall of the housing, and also bearing against the adjacent portion of the seal, and urging the seal along the shaft toward the interior of the housing to force its wedge-shaped end into engagement with the conical inner end of the groove.

3. The seal assembly described in claim 1, and a shaft encircling seal in the shaft journaling housing wall at a location spaced outwardly along the shaft from the described seal assembly, to prevent loss of fluid which passes from the groove of the described seal assembly into the bearing clearance space outside said groove along the shaft.

4. In a partitioned housing in which a rotatable shaft is journaled in opposite walls thereof, and in which the exposed portion of the shaft within the housing constitutes a portion of the partition which divides the housing internally into two adjacent but separate pressure compartments which are subjected to differential fluid pressure,
an annular seal assembly for preventing fluid under pressure from passing into that portion of the shaft bearing clearance space which communicates with the higher pressure compartment, traveling around the shaft through the bearing clearance space, and discharging from that portion of the bearing clearance space which communicates with the lower pressure compartment into said lower pressure compartment,
said seal assembly comprising:
an annular seal receiving groove in the shaft journaling portion of the housing wall near the inner surface thereof, and having
   (a) an annular outer end wall extending radially outward from the shaft surface in a plane substantially perpendicular to the shaft axis,
   (b) an adjoining annular substantially cylindrical side wall substantially parallel to and spaced radially from the shaft surface, and
   (c) adjoining said side wall, an annular conical inner end wall which is inclined inwardly at an acute angle toward the shaft surface, and toward the interior of the housing, and which intersects the inner surface of the shaft journaling housing wall at its juncture with the shaft surface to define a circular opening surrounding the shaft which is substantially the same diameter as the shaft, and is concentric therewith;
and an annular seal of flexible, resilient material snugly surrounding said shaft and seated in said groove;
said seal having a generally wedge shaped inner end and a cross sectional shape and size which is loosely complemental to the cross sectional shape and size of said groove, the angle of inclination of the conical surface of the seal being substantially the same as the angle of inclination of the conical inner end wall of the groove,
whereby fluid from the higher pressure compartment in the housing forces its way into that portion of the seal groove which is coextensive with the high pressure compartment, into the space between the seal and the walls of the groove, travels around the groove and shaft in that space, and exerts an axial inward pressure against that portion of the seal which is coextensive with and adjacent to the lower pressure compartment, and urges the wedge shaped inner end of the last mentioned portion of the seal into wedging engagement with the conical wall of the groove and with the adjoining surface of the shaft, thereby blocking leakage of fluid from the higher pressure compartment to the lower pressure compartment through the bearing clearance space surrounding the shaft, which would otherwise be in open communication with both compartments of the housing.

5. In a structure which includes a rotary shaft journaled in and projecting from both surfaces of the wall of a closed pressure compartment, and in which the shaft bearing clearance space is subjected to fluid pressure from within said compartment,
a pressure closed valve type sealing structure for said bearing clearance space surrounding the shaft comprising:
a radially recessed annular groove in the shaft journaling surface of said wall,
said groove having an annular conical end wall which is inclined at an acute angle toward the shaft journaling surface and away from the opposite end and bottom or side walls of the groove, defining, at the inclined end of the groove and in conjunction with the surface of the shaft, an annular valve seat which is generally wedge shaped in cross section, and
an endless ring type sealing element of flexible, resilient material seated in said groove and snugly embracing said shaft,
said seal having a cross sectional shape which is loosely complemental to the cross sectional shape of said groove, the generally wedge shaped end of said sealing element cooperating with said annular valve seat defined by the groove and shaft surface to seal any circumferential portion of the bearing clearance space, in response to fluid pressure exerted on said sealing element from that end of the groove which is remote from the conical end wall thereof.

6. In a structure which includes a journal and a journaling member, and in which the members cooperate under conditions which expose different circumferential portions of one end of the minute clearance space between them to spaced separated zones or areas which are under different fluid pressures,
a pressure closed, valve-type, annular sealing structure for preventing fluid from a zone under higher pressure from entering and traveling through said clearance space around the journal and emerging into a zone under lower pressure, comprising:
a radially extending circumferential groove recessed into the journal surface of one of said members near said one end of the minute clearance space between them, said groove having an annular conical end wall which is inclined at an acute angle toward the adjacent journal surface of the other member and away from the bottom or side wall of the groove, said conical end wall defining, in conjunction with the adjacent journal surface of the other member, an annular valve seat which is generally wedge shaped in cross section; and an annular sealing element of resilient material in said groove, one end of said sealing element being complementally wedge shaped to seat on said annular valve seat, the cross sectional size and shape of the remaining portion of said sealing element being smaller but generally complemental to the cross sectional shape of the groove and adjacent journal surface of the other member, whereby fluid from the zone of higher pressure forces its way past the wedge shaped end of the sealing element into a space between the sealing element and the opposite end wall of the groove, travels around the groove to a portion thereof adjacent the zone of lower pressure, and in attempting to escape into said zone of lower pressure forces the sealing element to seat firmly on its seat, thus blocking the entry of the high pressure fluid into said zone of lower pressure.

7. The sealing structure described in claim 6, and an additional annular sealing element of resilient material in said groove located between the first mentioned sealing element and that end of the groove remote from said valve seat, and responsive to fluid under pressure in said groove to seal the adjacent minute clearance space between the journal and journaling member, thus blocking leakage of fluid under pressure from the groove through that end of said clearance space remote from said valve seat.

8. The sealing structure described in claim 7 in which the said additional sealing element is sufficiently large in cross sectional diameter to be partially compressed between the first mentioned sealing element and that end wall of the groove remote from said valve seat, whereby due to its partial compression and its inherent resilience, said additional sealing element urges the first mentioned sealing element into a seated position on its valve seat.

9. In a structure which includes a journal and a journaling member, and in which the members cooperate under conditions which expose different circumferential portions of one end of the minute clearance space between them to spaced separated zones or areas which are under different fluid pressures, a pressure closed, valve-type, annular sealing structure for preventing fluid from a zone under higher pressure from entering and traveling through said clearance space around the journal and emerging into a zone under lower pressure, comprising:

a radially extending circumferential groove recessed into the journal surface of one of said members near said one end of the minute clearance space between them, said groove having an end wall adjacent said one end of said clearance space which is disposed transversely with respect to the journal surface of the other member, said end wall of the groove defining, in conjunction with the adjacent journal surface of the other member, an annular two surface valve seat which is generally wedge shaped in cross section; and an annular sealing element of flexible, compressible material in said groove, one portion of which is complementally wedge shaped and seats on said annular two-surface valve seat, the cross sectional shape of the remaining portion of said sealing element being generally complemental in configuration to the configuration of the remaining space in the groove defined by the groove walls and the adjacent journal surface of said other member, whereby fluid from a zone of higher pressure forces its way between the adjacent portions of the sealing element and its seat into the groove, travels around the groove to portions thereof adjacent a zone of lower pressure, and in attempting to move past the sealing element into said zone of lower pressure, forces the sealing element into sealing engagement with said valve seat, thus blocking escape of the high pressure fluid in the groove into said zone of lower pressure.

References Cited by the Examiner

UNITED STATES PATENTS

| | | | |
|---|---|---|---|
| 801,959 | 10/1905 | Badeker | 277—118 |
| 2,212,717 | 8/1940 | Penn | 277—92 X |
| 2,550,180 | 4/1951 | Allen | 92—125 X |
| 2,797,971 | 7/1957 | Greenough | 277—177 X |
| 3,052,476 | 9/1962 | Workman | 277—177 X |
| 3,097,855 | 7/1963 | Allen | 277—188 |
| 3,128,679 | 4/1964 | Trendle | 92—125 X |
| 3,166,832 | 1/1965 | Scannell | 277—188 X |

LAVERNE D. GEIGER, *Primary Examiner.*

J. MEDNICK, *Examiner.*